(12) United States Patent
Baghel et al.

(10) Patent No.: US 10,805,406 B2
(45) Date of Patent: Oct. 13, 2020

(54) ZONE REDUNDANT COMPUTING SERVICES USING MULTIPLE LOCAL SERVICES IN DISTRIBUTED COMPUTING SYSTEMS

(71) Applicant: Microsoft Technology Licensing, LLC, Redmond, WA (US)

(72) Inventors: Abhishek Singh Baghel, Bothell, WA (US); Girish Saini, Sammamish, WA (US); Rushi Srinivas Surla, Kenmore, WA (US); Ameya Bhagat, Redmond, WA (US); Ping-Yao Tseng, Seattle, WA (US); FNU Arunachaleshwar, Bellevue, WA (US); Marcus Swenson, Duvall, WA (US); Andrew Edwards, Bellevue, WA (US); Maneesh Sah, Sammamish, WA (US); Aaron Ogus, Woodinville, WA (US); Madhav Pandya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 16/015,069

(22) Filed: Jun. 21, 2018

(65) Prior Publication Data
US 2019/0394284 A1 Dec. 26, 2019

(51) Int. Cl.
*H04L 29/08* (2006.01)
*G06F 16/951* (2019.01)
*H04L 29/06* (2006.01)

(52) U.S. Cl.
CPC ............ *H04L 67/16* (2013.01); *G06F 16/951* (2019.01); *H04L 67/1002* (2013.01); *H04L 67/32* (2013.01); *H04L 67/42* (2013.01)

(58) Field of Classification Search
CPC ..... H04L 67/16; H04L 67/42; H04L 67/1008; H04L 67/1097; H04L 67/2809;
(Continued)

(56) References Cited

U.S. PATENT DOCUMENTS

| 7,539,907 B1 * | 5/2009 | Johnsen ............... G06F 11/008 714/26 |
| 9,755,986 B1 * | 9/2017 | Brown ............... H04L 67/2838 |

(Continued)

OTHER PUBLICATIONS

Zeng W, Zhao Y, Ou K, Song W. Research on cloud storage architecture and key technologies. InProceedings of the 2nd International Conference on Interaction Sciences: Information Technology, Culture and Human Nov. 24, 2009 (pp. 1044-1048). ACM. (Year: 2009).*

(Continued)

*Primary Examiner* — John A Follansbee
*Assistant Examiner* — James N Fiorillo
(74) *Attorney, Agent, or Firm* — Liang IP, PLLC

(57) ABSTRACT

Techniques for implementing zone redundant computing services in distributed computing systems are described herein. In one embodiment, a computing device is configured to query a database in a first availability zone for a list of computing services corresponding to a user account and provided by servers in a second availability zone different than the first availability zone. The computing device can then selects one or more computing services provided by the servers in the second availability zone from the queried list of computing services and transmit an instruction to the servers in the second availability zone for performing the requested data operation.

20 Claims, 8 Drawing Sheets

(58) Field of Classification Search
CPC . H04L 41/08; H04L 41/0273; H04L 41/0803;
H04L 41/0813; H04L 41/0896; G06F
9/54; G06F 9/546; G06F 9/572; G06F
9/5061
USPC .................................................. 709/203, 216
See application file for complete search history.

(56) References Cited

U.S. PATENT DOCUMENTS

| | | | | |
|---|---|---|---|---|
| 9,774,489 | B1* | 9/2017 | Gupta | H04L 67/34 |
| 9,860,317 | B1* | 1/2018 | Gupta | H04L 67/1097 |
| 10,061,652 | B2* | 8/2018 | Johnson | G06F 11/2033 |
| 10,116,732 | B1* | 10/2018 | Canton | H04L 41/0813 |
| 10,182,104 | B1* | 1/2019 | Canton | H04L 41/0813 |
| 10,346,367 | B1* | 7/2019 | Luszcz | H04L 67/42 |
| 10,397,051 | B1* | 8/2019 | Featonby | H04L 41/08 |
| 2011/0265168 | A1* | 10/2011 | Lucovsky | G06F 21/62 726/7 |
| 2012/0005026 | A1* | 1/2012 | Khan | G06Q 30/02 705/14.64 |
| 2012/0243687 | A1* | 9/2012 | Li | H04L 9/085 380/277 |
| 2014/0074780 | A1* | 3/2014 | Goetsch | G06F 16/273 707/613 |
| 2014/0108474 | A1* | 4/2014 | David | G06F 16/182 707/827 |
| 2014/0207918 | A1* | 7/2014 | Kowalski | G06F 11/0709 709/220 |
| 2014/0207919 | A1* | 7/2014 | Kowalski | H04L 41/0896 709/220 |
| 2014/0237070 | A1* | 8/2014 | Choi | G06F 3/067 709/216 |
| 2015/0058467 | A1* | 2/2015 | Douglas | G06Q 10/0631 709/223 |
| 2015/0215163 | A1* | 7/2015 | Kowalski | G06F 11/0709 714/4.1 |
| 2015/0317169 | A1* | 11/2015 | Sinha | H04L 61/2076 713/2 |
| 2017/0034012 | A1* | 2/2017 | Douglas | H04L 41/5077 |
| 2017/0163731 | A1* | 6/2017 | Borlick | G06F 3/0604 |
| 2017/0223117 | A1* | 8/2017 | Messerli | H04L 12/4641 |
| 2017/0262638 | A1* | 9/2017 | Horowitz | G06F 9/54 |
| 2018/0019969 | A1* | 1/2018 | Murthy | H04L 61/2007 |
| 2018/0032399 | A1* | 2/2018 | Johnson | G06F 11/2033 |
| 2018/0089249 | A1* | 3/2018 | Collins | G06F 16/2365 |
| 2018/0089250 | A1* | 3/2018 | Collins | G06F 16/282 |
| 2018/0089299 | A1* | 3/2018 | Collins | G06F 9/5061 |
| 2018/0091583 | A1* | 3/2018 | Collins | H04L 41/0813 |
| 2018/0359311 | A1* | 12/2018 | Paramasivam | H04L 67/28 |
| 2019/0012105 | A1* | 1/2019 | Schreter | H04L 67/1097 |
| 2019/0171650 | A1* | 6/2019 | Botev | G06F 16/256 |

OTHER PUBLICATIONS

Stabler G, Rosen A, Goasguen S, Wang KC. Elastic IP and security groups implementation using OpenFlow. InProceedings of the 6th international workshop on Virtualization Technologies in Distributed Computing Date Jun. 18, 2012 (pp. 53-60). (Year: 2012).*
"International Search Report and Written Opinion Issued in PCT Application No. PCT/US19/036643", dated Sep. 24, 2019, 13 Pages.

* cited by examiner

ZONE REDUNDANT COMPUTING SERVICES USING MULTIPLE LOCAL SERVICES IN DISTRIBUTED COMPUTING SYSTEMS

BACKGROUND

Distributed computing systems typically include multiple routers, switches, bridges, and other network devices that interconnect a large number of servers, network storage devices, and other types of nodes via wired or wireless network links. Among other things, the individual nodes can receive and store data from users and can cooperate with one another to facilitate retrieval or modification of the stored user data. Such a data storage technique is commonly referred to as "cloud storage."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementing cloud storage typically involves utilizing a large number of nodes interconnected by a computer network to provide data storage, retrieval, modification, deletion, or other suitable computing services. Such large number of nodes can be organized into availability zones each having corresponding independent power, computer network, and cooling infrastructure. In one example, an availability zone can include nodes in a single datacenter. In another example, an availability zone can include nodes in multiple datacenters physically located in a geographical area. In further examples, an availability zone can include multiple racks, clusters, buildings, or other suitable logical and/or physical groupings within a single datacenter. In any of the examples above, a failure of power, computer network, or cooling infrastructure in one availability zone does not affect computing operations in another availability zone.

Each availability zone for implementing cloud storage can have a suitable number of nodes for deploying corresponding frontend, partition, and backend storage, utility, or other suitable types of cloud storage services. The frontend services can be configured to receive and respond to user requests for reading, writing, erasing, or performing other suitable data operations on certain user data associated with a user account. The partition service can be configured to determine which backend storage service can facilitate the requested data operation. The backend storage service can be configured to perform storage, retrieval, maintenance, or other suitable operations on at least a portion of the user data. Within each availability zones, user data can be replicated onto multiple nodes to provide redundancy and data resiliency. Thus, when one node fails, at least one redundant copy of the same data is still available from one or more other nodes.

The foregoing single availability zone-based data redundancy, however, can have certain risks of data unavailability or even data loss when an entire availability zone becomes unavailable. For example, when an availability zone that is a datacenter or a building in a datacenter burns down, replicated data in the datacenter or the building in the datacenter can become unavailable or even lost. In another example, when one or more datacenters in a geographical area experience a regional electricity blackout (e.g., the Northeast blackout of 2003), any data stored in the datacenters can become unavailable. Such unavailability or even loss of data can negatively impact user experiences of the cloud storage services.

Several embodiments of the disclosed technology can address at least some aspects of the foregoing challenge by implementing availability zone-redundant computing services in a distributed computing system. In certain implementations, multiple local computing services can be deployed in each availability zone of the distributed computing system. The local computing services can then be "stitched" together to form a virtual computing service across multiple availability zones. As such, even when an entire availability zone becomes unavailable due to, for instance a datacenter blackout, other availability zones not located in the datacenter can still provide data storage or other suitable computing services to users, thereby to reduce risks of data unavailability or even loss of data to users.

In certain embodiments, during a build or deployment of multiple availability zones, a deployment description file for a user or client can be provided to a fabric controller (or a cluster controller, a datacenter controller, or other suitable types of controller) in an availability zone for resource allocation. The deployment description file can include data representing a list of frontend, partition, backend storage, utility, or other suitable types of computing services to be deployed in the availability zone for the client. For example, the list can include three hundred frontend, partition, and backend storage services. The list can also include three to five utility services such as Cosmos Web Server (CWS), XStorage Diagnostics Server (XDS), etc.

In response, the fabric controller can allocate the list of computing services to corresponding nodes in the availability zone and assign an IP address (and other suitable network parameters) for accessing each computing service. Based on the responses from the fabric controllers, a general deployment description file can be generated by aggregating information from the individual deployment description files and responses from the fabric controllers. The general deployment description file can include a list of various types of computing services for the client across multiple availability zones, individual nodes hosting the computing services, and corresponding IP addresses for accessing the computing services. The general deployment description file can then be shared with each availability zone for access by one or more runtime services configured to facility service discovery in each availability zone.

During runtime, a user request for a data operation (e.g., data read or data write) can be received from a client device and routed to a software load balancer (SLB) in an availability zone based on a round robin domain name system (DNS) scheme. For example, the user request can be identified by or submitted to a particular universal resource locator (URL) for which multiple IP addresses are present. Each IP address corresponds to a SLB in a corresponding availability zone. Once the client device receives the multiple IP addresses, the client device can select one randomly or in other suitable manners to transmit the user request to the corresponding SLB. In turn, the SLB can select a frontend service from a number of frontend services in the same availability zone for receiving and processing the user request. The SLB can select the frontend service randomly, based on a current or historical load of all the frontend services, or in other suitable manners.

Upon receiving the user request, the frontend service can be configured to query a zone redundant runtime service for a list of available partition services. Unlike in other cloud storage systems, the runtime service in each of the availability zones has access to the general deployment description file which contains data representing not only partition services for the client available in the same availability zone but also in other availability zones of the distributed computing system. Thus, the frontend service can select, from the list, a partition service in a different availability zone for locating corresponding storage locations of the requested data operation.

Upon selecting the partition service from another availability zone, the frontend service can transmit a query request to the partition service for a storage location of the data based on a table partition index contained in or accessible by the selected partition service. Once the storage location is determined, the partition service (or the frontend service) can transmit a data request (e.g., for data read or data write) to a corresponding backend storage service (e.g., in yet another availability zone) for performing the requested data operation. In one example, the backend storage service can retrieve requested data and provide the retrieved data to the frontend service directly or via the partition service. In other examples, the performed data operation (e.g., a data write) can also be replicated to additional storage locations in the same and different availability zones in a daisy chain, star, or other suitable manners.

As such, the frontend, partition, and backend storage services are located in multiple availability zones, and a "virtual" cloud storage service utilizing the various frontend, partition, and backend storage services spanning the multiple availability zones can be provided to users of the cloud storage service. Thus, user requests can be served by suitable cloud storage services in any availability zones accessible to the users. As such, by replicating and/or serving data from across multiple availability zones, data resiliency over failures of an entire availability zone can be improved while risks of data unavailability or even data loss can be reduced when compared to zone-dependent storage schemes.

DETAILED DESCRIPTION

Figure 1:
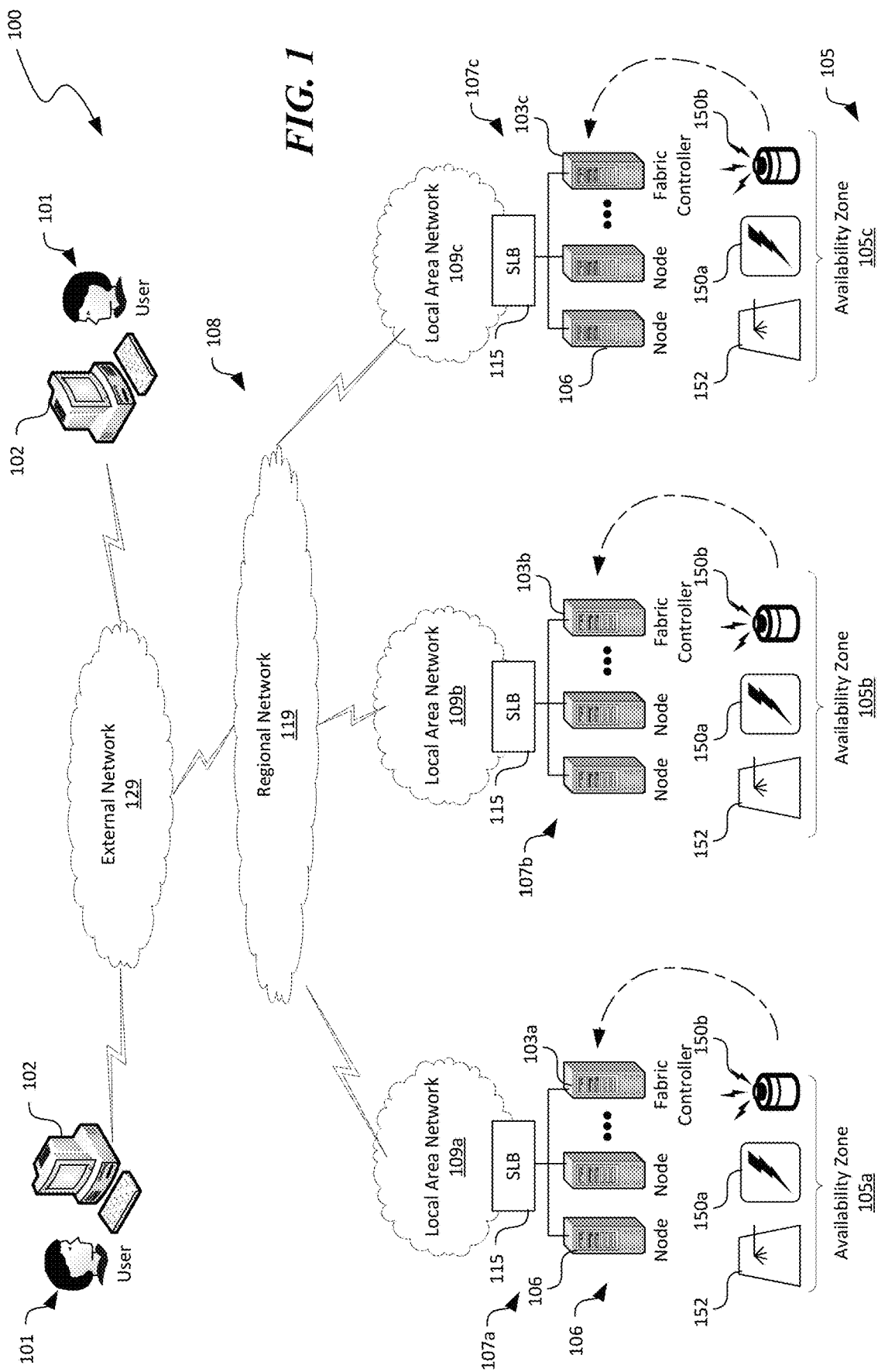
FIG. 1 is a schematic diagram illustrating a distributed computing system implementing zone redundant computing services configured in accordance with embodiments of the disclosed technology.

Certain embodiments of systems, devices, components, modules, routines, data structures, and processes for implementing zone redundant computing services in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term a "distributed computing system" generally refers to a computing system having a plurality of network devices that interconnect a plurality of servers or nodes to one another or to external networks (e.g., the Internet) to form an interconnected computer network. The term "network device" generally refers to a physical network device, examples of which include routers, switches, hubs, bridges, load balancers, security gateways, or firewalls. A "node" generally refers to a physical computing device configured to implement, for instance, one or more virtual machines or other suitable virtualized components. For example, a node can include a server having a hypervisor configured to support one or more virtual machines or other suitable types of virtual components for providing various types of cloud computing services.

Further used herein, the term "cloud computing service," "cloud service," or "service" generally refers to one or more computing resources provided over a computer network such as the Internet by a remote computing facility. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, an "availability zone" or "zone" generally refers to a group of nodes in a distributed computing system that are supported by independent power (e.g., a utility power source), computing networks (e.g., a local area network), and cooling (e.g., cooling towers, refrigeration units, or other suitable types of cooling sources). In the following description, a computing cluster in a datacenter is used as an example of an availability zone for illustration purposes only. Other examples of an availability zone can include an entire datacenter, multiple datacenters in a geological region, multiple racks in a datacenter, multiple computing clusters in a datacenter, a number of nodes in a building of a datacenter, or other suitable logical and/or physical groupings. A high speed regional computer network can interconnect multiple availability zones such that computing services in different availability zones can communicate with one another.

A "computing cluster" or "cluster" generally refers to groups, sets, or subsets of nodes in a distributed computing system that are separated managed by one or more corresponding fabric controllers. In one example, a cluster can include a number of servers operatively coupled to one another by a computer network and configured to deploy multiple frontend, partition, and backend storage services, as described in more detail below with reference to FIGS. 3A-3C. As used herein, partition and backend storage services are collectively referred to as "backend services". In other examples, a cluster can also include a number of network storage devices, or other suitable components.

In certain implementations, each availability zone can contain a number of nodes for deploying corresponding frontend, partition, and backend storage, utility, or other suitable types of cloud storage services. Within each availability zones, user data can be replicated onto multiple nodes to provide redundancy and data resiliency. Thus, when one node fails, a redundant copy of the same data is still available from one or more other nodes. Such zone-based redundancy, however, can cause potential unavailability or even loss of data when, for example, power is lost to an entire availability zone.

Several embodiments of the disclosed technology can address at least some aspects of the foregoing challenge by implementing availability zone-redundant computing services in a distributed computing system. In certain implementations, multiple local computing services are deployed in each availability zone. The local computing services are then "stitched" together to form an overall virtual computing service across multiple availability zones. As such, even when an entire availability zone becomes unavailable, other availability zones of the distributed computing system can still provide data storage or other suitable computing services to users, thereby to reduce risks of data unavailability or even loss of data to users, as described in more detail below with reference to FIGS. 1-5.

FIG. 1 is a schematic diagram illustrating a distributed computing system 100 zone-redundant computing services in accordance with embodiments of the disclosed technology. As shown in FIG. 1, the distributed computing system 100 can include a computer network 108 interconnecting a plurality of nodes 106 in multiple availability zones 105 and a plurality of users 101 via corresponding client devices 102 to one another. Even though particular components of the distributed computing system 100 are shown in FIG. 1, in other embodiments, the distributed computing system 100 can also include network storage devices, maintenance managers, and/or other suitable components (not shown) in addition to or in lieu of the components shown in FIG. 1.

As shown in FIG. 1, the computer network 108 can include multiple sub-computer networks interconnected with one another. For instance, in the illustrated embodiment, the computer network 108 can include multiple local area networks 109 (illustrated as first, second, and third local area networks 109a-109c, respectively) individually interconnecting multiple nodes 106 in each availability zone 105. The individual local area networks 109 can include corresponding network devices (e.g., routers, switches, firewalls, etc., not shown) interconnecting the corresponding nodes 106 via hardwired or wireless connections. The computer network 108 can also include a regional network 119 interconnecting the local area networks 109 of the multiple availability zones 105. The computer network 108 can further include a wide area network, the Internet, or other suitable types of external network 129 to interconnect the local area networks 109 to the client devices 102. Thus, the computer network 108 can allow communications among the nodes 106 in each of the availability zones and the client devices 102 according to any suitable network protocols. In other embodiments, the computer network 108 can have other suitable topologies for interconnecting the local area networks 109 and/or the regional network 119 to the external network 129.

In certain embodiments, the nodes 106 in each availability zones 105 can be organized into racks, groups, sets, cluster, or other suitable divisions. For example, in the illustrated embodiment, the nodes 106 are grouped into three clusters 107 identified individually as first, second, and third clusters 107a-107c. Each cluster 107 can include multiple nodes 106 managed by a cluster manager 103 (identified individually as first, second, and third cluster manager 103a, 103b, and 103c, respectively) configured to monitor and manage various operations of and facilitate functionalities performed by the corresponding nodes 106 in the clusters 107. Each cluster 107 can also deploy one or more software load balancers or SLBs 115 (only one is shown for each cluster 107 for illustration purposes) that are configured to distribute a service request or computing task to one or more nodes 106.

In the illustrated example, each cluster 107 belongs to a corresponding availability zone 105 (identified individually as first, second, and third availability zones 105a, 105b, and 105c, respectively). Each availability zone 105 can have corresponding infrastructure of power (e.g., a main power source 150a and backup power source 150b), cooling (e.g., a cooling source such as a cooling tower 152, refrigeration unit, etc.), and computer network (e.g., the local area network 109) for supporting operations of the nodes 106. In other examples, each availability zone 105 can also include additional clusters (not shown) collectively managed by a corresponding cluster manager 103 and individually managed by a cluster controller (not shown). In further examples, each availability zone 105 can also include multiple fabric controllers individually managing multiple computing clusters 107.

The nodes 106 can individually be configured to provide computing, storage, and/or other suitable cloud computing services to the individual users 101. For example, as described in more detail below with reference to FIG. 2, the nodes 106 in each cluster 107 can be configured to deploy frontend services 114, partition services 116, and backend storage services 118 (shown in FIG. 2) to provide cloud storage services to the users 101. The users 101 can then utilize the provided cloud storage services to store, retrieve, manage, or perform other suitable data operations on user data.

The client devices 102 can each include a computing device that facilitates corresponding users 101 to access cloud services provided by the nodes 106 via the computer network 108. For example, in the illustrated embodiment, the client devices 102 individually include a desktop computer. In other embodiments, the client devices 102 can also include laptop computers, tablet computers, smartphones, or other suitable computing devices. Even though two users 101 are shown in FIG. 1 for illustration purposes, in other embodiments, the distributed computing system 100 can facilitate any suitable number of users 101 to access suitable types of cloud computing services provided by the nodes 106.

In operation, the users 101 can transmit user requests 170 (shown in FIG. 3A) for performing certain data operation to the distributed computing system 100. In response, the distributed computing system 100 can be configured to serve such user requests from computing services located at multiple availability zones. For example, user data stored in the distributed computing system 100 can be replicated onto nodes 106 in different availability zones 105. In another example, the user requests 170 can also be served with computing services from nodes 106 located at different availability zones. By distributing such data operations and corresponding computing services to multiple availability zones, data resiliency can be improved because each availability zone 105 can have independent power, computer network, and cooling infrastructure. Simultaneous failure of multiple availability zones due to interruptions in power, computer network, or cooling can be highly unlikely.

Figure 2:
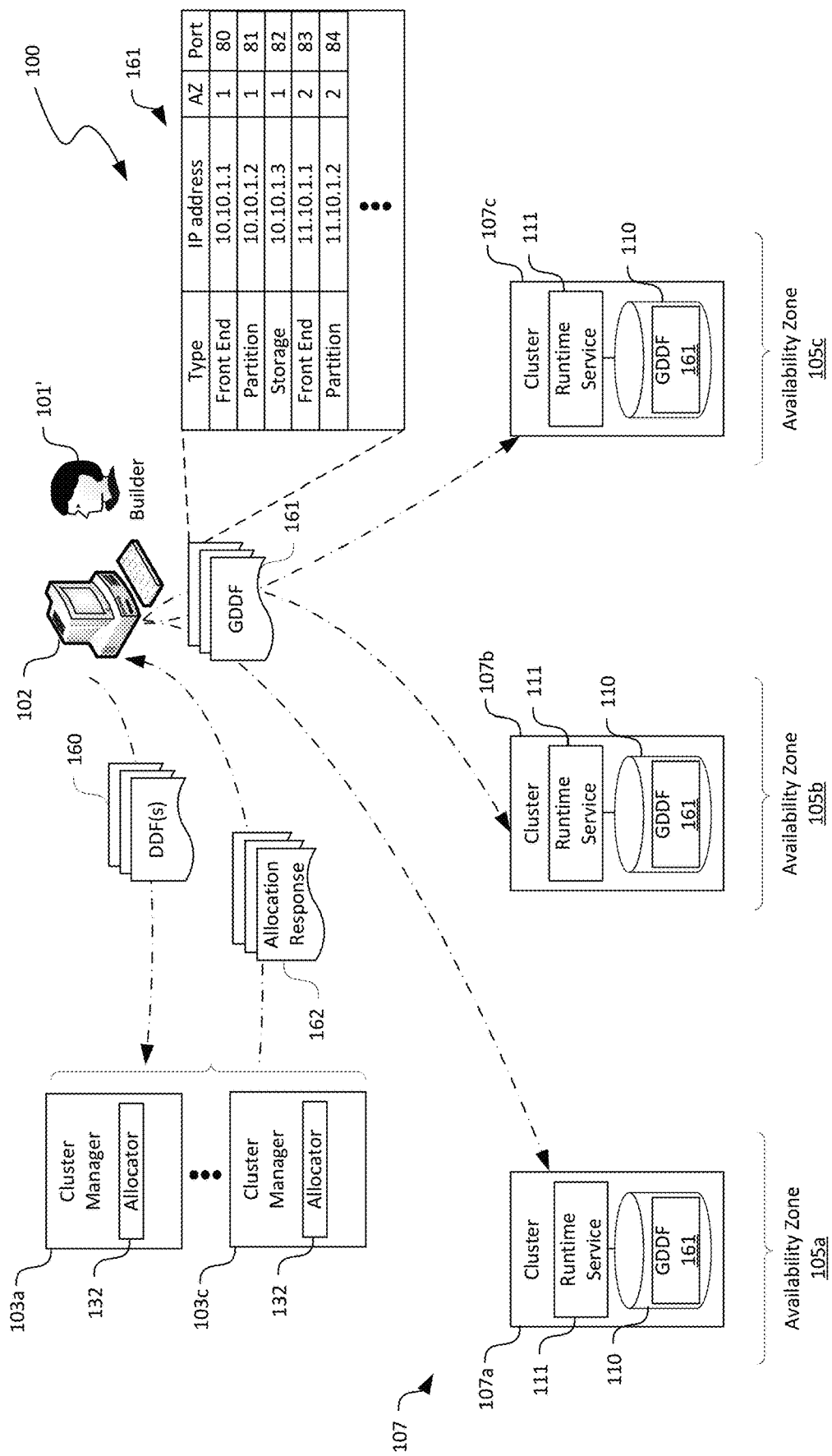
FIG. 2 is a schematic diagram illustrating certain hardware/software components of the distributed computing system of FIG. 1 during a build or update in accordance with embodiments of the disclosed technology.

FIG. 2 is a schematic diagram illustrating certain hardware/software components of the distributed computing system 100 of FIG. 1 during a build or update in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit, or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 2, during a build or update of the availability zones 105, a builder (or build fabricator) 101' can supply one or more deployment description files (shown in FIG. 2 as DDF(s) 160) to the cluster managers 103 in each availability zone 105 (or an availability zone 105 to be added to the distributed computing system 100). The deployment description files 160 can each include data representing a list of frontend, partition, backend storage, utility, or other suitable types of computing services to be deployed in the corresponding availability zone 105.

As shown in FIG. 2, the cluster managers 103 can each include an allocator 132 configured to allocate the list of computing services to corresponding nodes 106 (FIG. 1) in each availability zone 105 and assign an IP address (and other suitable network parameters) for each computing service. The cluster managers 103 can then return a list of assigned IP addresses or other suitable information as allocation responses 162 to the builder 101'.

Based on the DDFs 160 and allocation responses 162 from the cluster managers 103, a general deployment description file (shown as GDDF 161 in FIG. 2) can be generated by aggregating information from the individual DDFs 160 and the allocation responses 162. Thus, the GDDF 161 can include a list of various types of computing services for a client across multiple availability zones 105, individual nodes 106 hosting the computing services, and corresponding IP addresses for accessing the computing services. For example, as shown in FIG. 2, the GDDF 161 can include a table having multiple entries of service type (i.e., "Type"), network address (i.e., "IP address"), a port number, and corresponding availability zone (i.e., "AZ"). One example entry identifies a frontend service at an IP address of "10.10.1.1" from the first availability zone 105a, i.e., "AZ1." Another example entry identifies a partition service at an IP address of "11.10.1.2" and port 81 from the second availability zone 105b, i.e., "AZ2." The GDDF 161 can then be provided to each availability zone 105 to be stored in a corresponding database 110 and/or accessible by one or more runtime services 111. As such, each availability zone 105 can have the same GDDF 161. The runtime services 111 can be configured to facilitate service discovery in each availability zone 105, as described in more detail below with reference to FIGS. 3A-3C.

Upon changes in the availability zones 105, the GDDF 161 can be updated accordingly. For example, when another availability zone 105 (not shown) is added to the distributed computing system 100, additional entries corresponding to additional computing services in the added availability zone 105 can be inserted into the existing GDDF 161. The updated GDDF 161 can then be disseminated to each of the existing availability zones 105. When one of the availability zone 105 (e.g., the third availability zone 105c) is removed due to power failure or other suitable reasons, the GDDF 161 at other availability zones 105 can be similarly updated. In certain embodiments, additional instances of computing services may be started in the still operational availability zones 105 in response to the removal of an availability zone 105 to provide quorum for decision making, or for other suitable purposes.

Figure 3A:
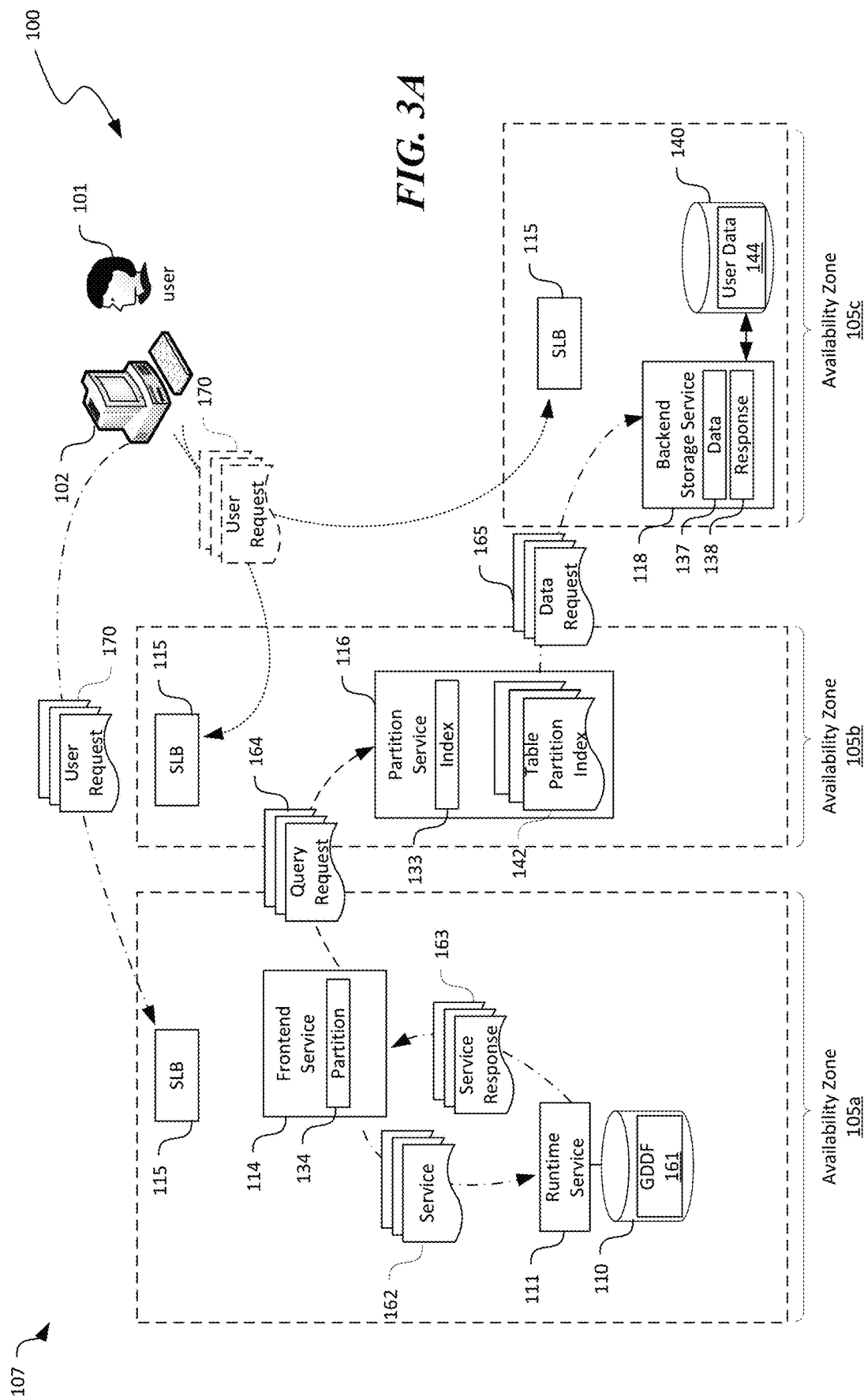
FIGS. 3A-3C are block diagrams illustrating certain components of the distributed computing system during certain stages of data operations in accordance with embodiments of the disclosed technology.
Figure 3B:
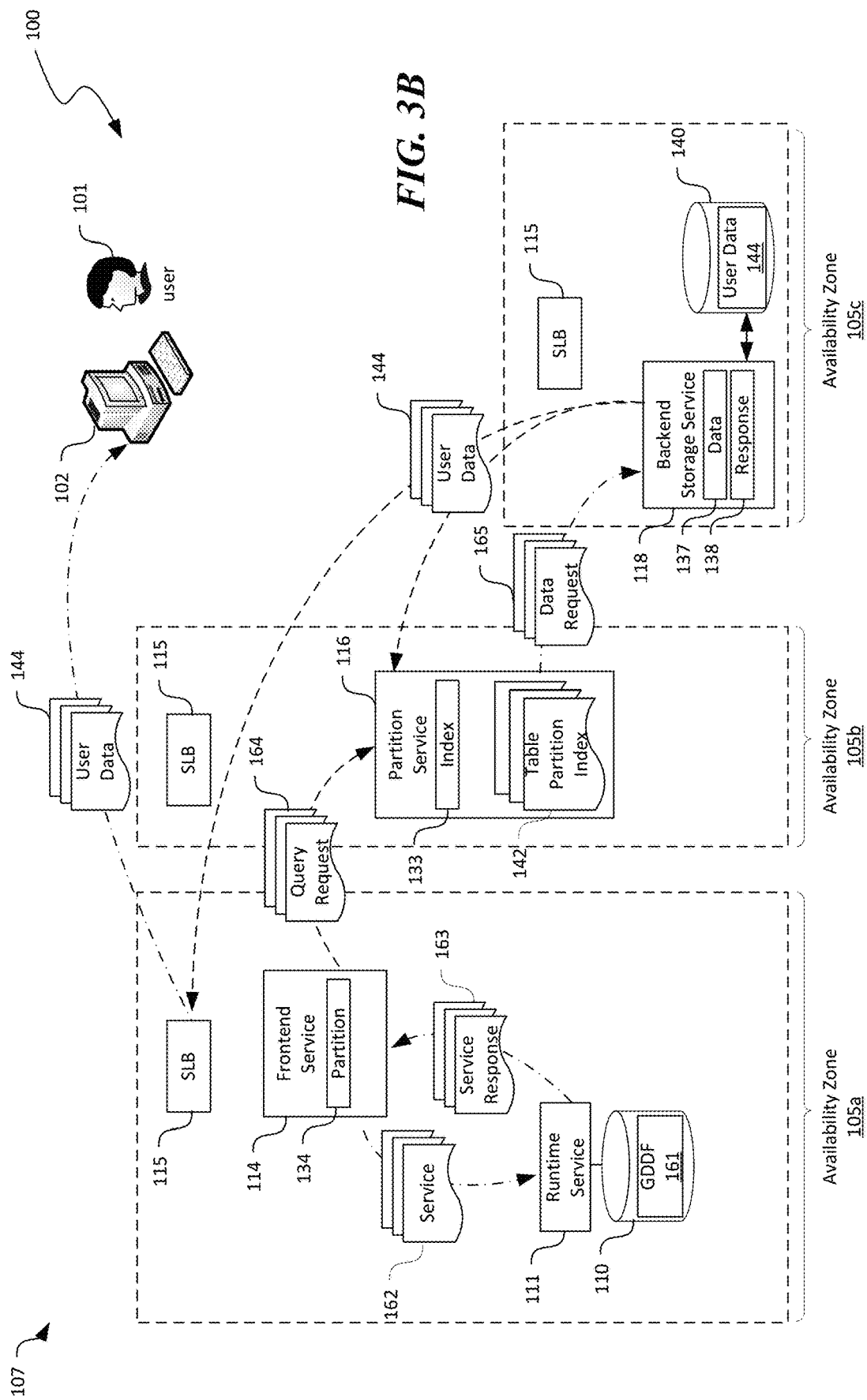
Figure 3C:
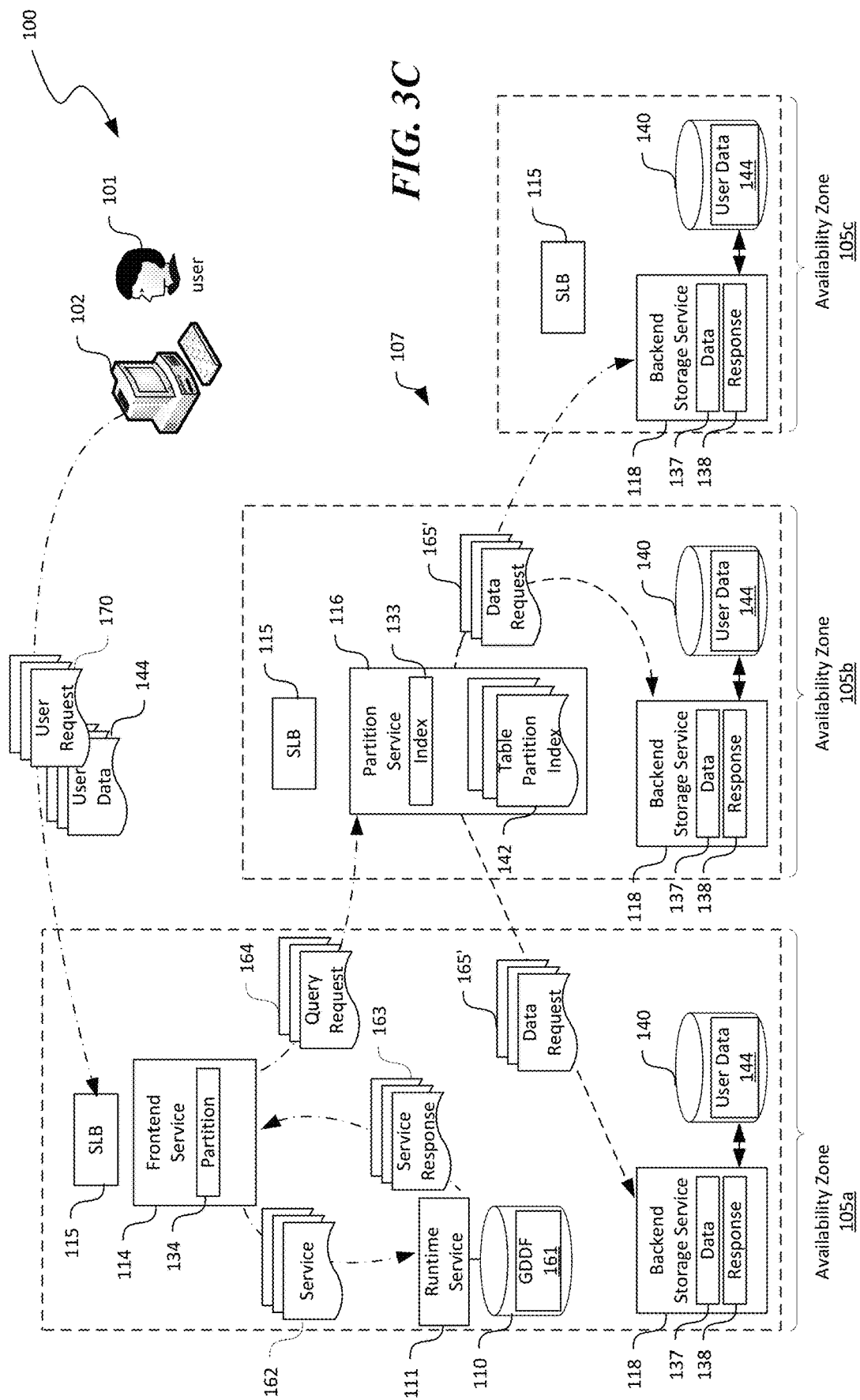

FIGS. 3A-3C are block diagrams illustrating certain components of the distributed computing system 100 during certain stages of data operations in accordance with embodiments of the disclosed technology. As shown in FIG. 3A, a user 101 can submit a user request 170 to the distributed computing system 100 for certain data operations such as a data read or write. In certain embodiments, the user request 170 can be distributed to different availability zones 105 based on a round robin domain name system (DNS) scheme. For example, each availability zones 105 can deploy one or more software load balancers 115 (only one is shown in FIGS. 3A-3C for illustration purposes). The user request 170 can be identified by or submitted to, from a client device 102, a particular universal resource locator (URL) for which multiple IP addresses corresponding to the different SLBs 115 are present. Once the client device 102 receives the multiple IP addresses, the client device 102 can select one randomly or in other suitable manners to transmit the user request 170 to one of the SLBs 115. In turn, the selected SLB 115 can select a frontend service 114 in the same availability zone 105 for servicing the user request 170 randomly, based on a current or historical load of all the frontend services, or in other suitable manners. In the illustrated example in FIG. 3A, an SLB 115 in the first availability zone 105a is selected, which in turn selected a frontend service 114 at the first availability zone 105a for servicing the user request 170. In other embodiments, the user request 170 can be distributed to SLBs 115 in different availability zones 105 randomly, sequentially, or in other suitable manners (shown in FIG. 3A in phantom lines for clarity).

As shown in FIG. 3A, the frontend service 114 can include a partition component 134 configured to determine which partition service 116 contains or has access to a table partition index 142 associated with a user account of the user 101. In the illustrated example, the partition component 134 can transmit a service request 162 to the runtime service 111 in the first availability zone 105*a* to query for the partition service 116 corresponding to the user 101. In response, the runtime service 111 can provide a service response 163 access records of the GDDF 161 and identifying the partition service 116 according to information contained in the GDDF 161. In the illustrated example, the identified partition service 116 is located in the second availability zone 105*b* for illustration purposes. In other examples, the identified partition service 116 can be located at the same (i.e., the first availability zone 105*a*) or other availability zones 105 (e.g., the third availability zone 105*c*). Upon selecting the partition service 116, the frontend service 114 can transmit a query request 164 to the partition service 116 for a storage location of the user data 144 based on a table partition index 142 contained in or accessible by the partition service 116.

The partition service 116 can include an index component 133 and a table partition index 142. Locations at which user data 144 is stored in the distributed computing system 100 can be tracked using an index table having rows and columns. However, the index table can be quite large due to a large number of user accounts. As such, the index table can be partitioned into multiple table partition indices 142, for example to contain certain rows of the overall index table. The multiple table partition indices 142 can then be individually stored and managed by a corresponding partition service 116. For example, as shown in FIG. 3A, the partition service 116 at the second availability zone 105*b* can contain a table partition index 142 corresponding to the user 101 while other partition services (not shown) in other availability zones 105 can contain additional table partition index 142 for other user accounts.

The table partition index 142 can include a portion of the index table with rows and columns containing locations at which the requested user data 144 is stored. In the example shown in FIG. 3A, the table partition index 142 of the partition service 116 can include a row containing a user account identifier corresponding to the user 101 and a location (e.g., the third availability zone 105*c*) at which the requested user data 144 is stored, or a corresponding backend storage service (e.g., the backend storage service 118 at the third availability zone 105*c*) having access to the stored user data 144. Thus, the index component 133 can be configured to scan the table partition index 142 to determine that a copy of the requested user data 144 is stored at the third availability zone 105*a*. Based on the determination, the partition service 116 can be configured to generate and transmit a data request 165 to the backend storage service 118 at the third availability zone 105*c* based on the query request 162.

The backend storage service 118 can include a data component 137 and a response component 138 operatively coupled to a data storage 140. The data component 137 can be configured to facilitate storage, retrieval, management, or other data operation on the user data 144. For example, the data component 137 can be configured to retrieve requested user data 144 from a corresponding storage 140. The response component 138 can then be configured to generate a response, for example, containing the requested user data 144 and provide the user data 144 to the frontend service 114 directly or via the partition service 116, as shown in FIG. 3B.

In the illustrated example in FIG. 3B, the frontend service 114 can then provide the requested user data 144 to the client device 102. In other examples, the backend storage service 118 can also provide the requested user data 144 directly to the client device 102 or via other suitable network channels.

FIG. 3C illustrates an example data write operation in the distributed computing system 100. As shown in FIG. 3C, upon receiving the query request 163 for a data write operation, the index component 133 of the partition service 116 at the second availability zone 105*b* can select, based on another copy of GDDF 161 (not shown) in the second availability zone 105*b*, locations in each availability zone 105 for storing the user data 144 and corresponding backend storage service 118 for facilitation the data write operation. Upon selection of the backend storage services 118, the partition service 116 can be configured to transmit to each of the backend storage services 118 a data request 165' for storing the user data 144. Upon completion of storing the user data 144, the backend storage services 118 can provide the partition service 116 a confirmation for completion of the data operation. Once a threshold number (e.g., two out three) of confirmation has been received, the partition service 116 can notify the user 101, for instance, via the frontend service 114, that the user data 144 has been stored in the distributed computing system 100. In certain implementations, one copy of the user data 144 is stored in each availability zone 105. In other implementations, multiple copies of the user data 144 can be stored in each availability zone 105, via, for instance, in-zone replication.

Figure 4A:
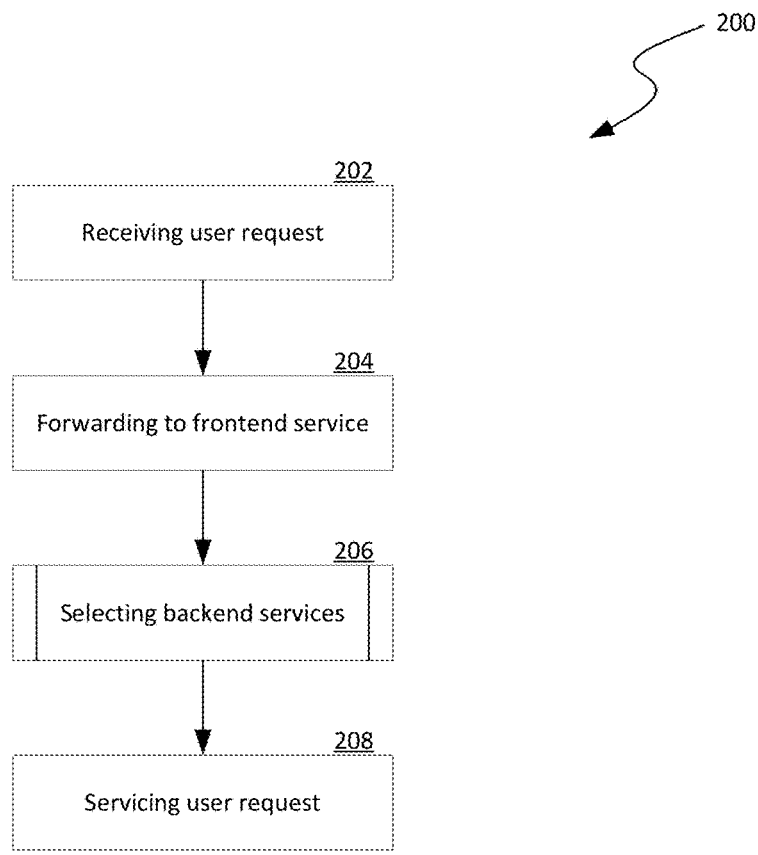
FIGS. 4A-4C are flowcharts illustrating aspects of processes of implementing zone redundant computing services in a distributed computing system in accordance with embodiments of the disclosed technology.
Figure 4B:
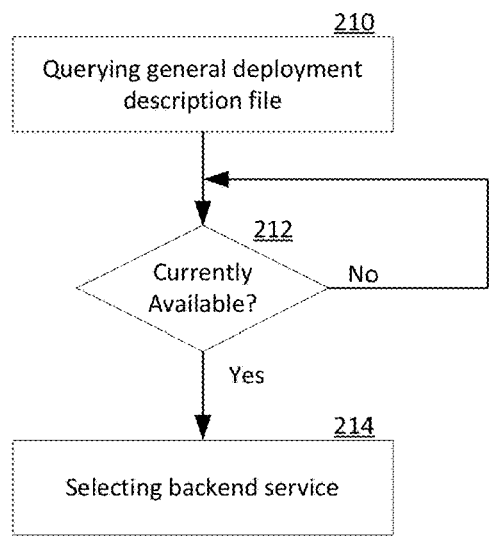
Figure 4C:
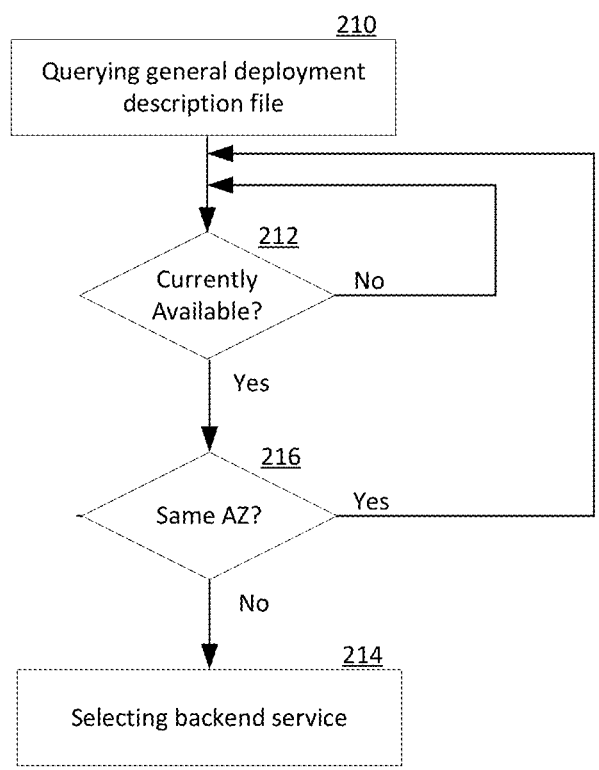

FIGS. 4A-4C are flowcharts illustrating aspects of processes of zone redundant computing services in a distributed computing system in accordance with embodiments of the disclosed technology. Even though the processes are described in connection with the distributed computing system 100 of FIG. 1, in other embodiments, the processes can also be implemented in computing systems with different and/or additional components.

As shown in FIG. 4A, the process 200 can include receiving a user request for data operations at stage 202. The process 200 can then include forwarding the user request to a frontend service at stage 204. In certain embodiments, the user request can be forwarded to a frontend service at a random availability zone using a round robin DNS scheme, as described in more detail above with reference to FIG. 3A. In other embodiments, the user request can be forwarded to a suitable frontend service in other suitable manners.

The process 200 can then include selecting one or more backend services at stage 206. In certain embodiments, each availability zone can contain or have access to a general deployment description file that contains data of all available computing services available to a client at multiple availability zones of the distributed computing system. As such, selecting one or more backend services can include querying the general deployment description file for a list of backend services, determining whether the backend services in the list is currently available, and selecting one of the available backend services from the list. As such, the selected one or more backend services can be in the same availability zone or in different availability zones as the frontend service. Example operations of selecting the backend services are described in more detail below with reference to FIG. 4B. Upon selecting the one or more backend services, the process 200 can then include servicing the user request with the selected backend services.

FIG. 4B illustrate example operations for selecting backend services for a read operation in accordance with embodiments of the disclosed technology. As shown in FIG. 4B, the operations can include querying a general deployment description file for a list of backend services at multiple availability zones at stage 210. Examples of the general deployment description file and associated process of creation and/or update are described above with reference to FIG. 2. The operations can then include a decision stage to determine whether a backend service in the list is currently available. In certain embodiments, a fabric controller (or other suitable types of controller) can maintain status of health of various services by periodically transmitting and receiving messages from one another. In other embodiments, status of the backend services can be maintained in other suitable manners. In response to determining that a backend service is currently available, the operations can include selecting the backend service to service the user request at stage 214. Otherwise, the operations can include determining whether another backend service is available at stage 212. Thus, even when an entire availability zone has failed, embodiments of the disclosed technology can seamlessly service the user request from computing services from other availability zones.

FIG. 4C illustrate example operations for selecting backend services for a write operation in accordance with embodiments of the disclosed technology. As shown in FIG. 4B, the operations can include querying a general deployment description file for a list of backend services at multiple availability zones at stage 210 and a decision stage 212, generally similar to those described above with reference to FIG. 4B. The operations can then include another decision stage 216 to determine whether a backend service is in the same availability zone as another already selected backend service. In response to determining that the backend service is in the same availability zone as another already selected backend service, the operations reverts to stage 212 to determine whether a further backend service is available. Otherwise, the operations include selecting backend service at stage 214.

Figure 5:
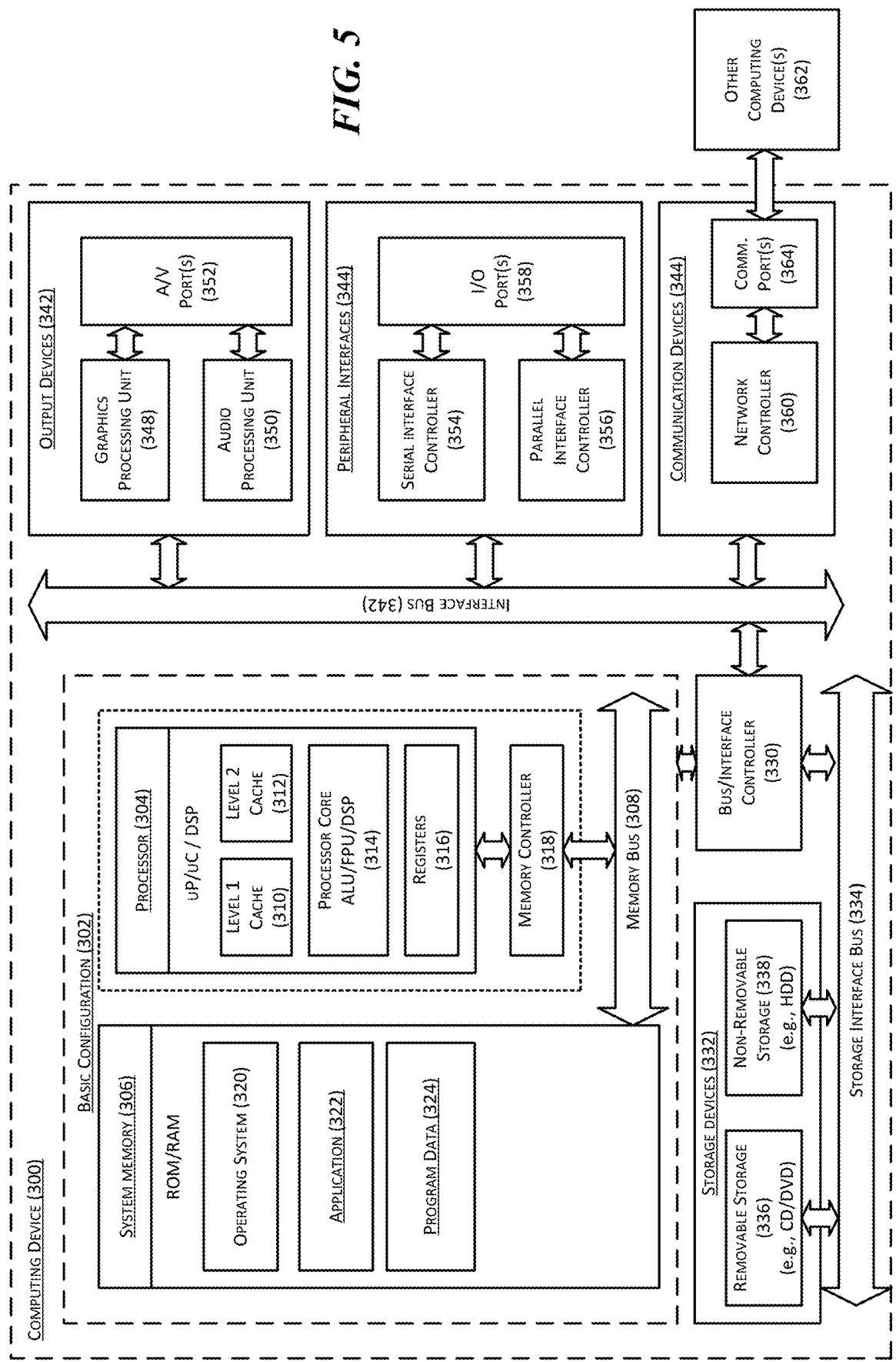
FIG. 5 is a computing device suitable for certain components of the distributed computing system in FIG. 1.

FIG. 5 is a computing device 300 suitable for certain components of the distributed computing system 100 in FIG. 1. For example, the computing device 300 can be suitable for the nodes 106, the client devices 102, or the cluster resource manger 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of implementing zone redundant computing services in a distributed computing system having multiple network connected availability zones individually containing multiple servers interconnected to one another by a computer network, the method comprising:
   receiving, at a server in a first availability zone, a user request from a user for a data operation to be performed in the distributed computing system by an overall virtual computing service having multiple local computing services; and
   in response to receiving the user request at the server in the first availability zone,
      selecting an instance of a first local computing service at the first availability zone to interface with the user;
      upon selecting the instance of the first local computing service, querying, at the first availability zone, a database at the first availability zone for a list of instances of a second local computing service of the overall virtual computing service corresponding to a user account of the user and provided by servers in a second availability zone different than the first availability zone, the first and second availability zones having respective independent power, computer network, and cooling infrastructure, wherein the database containing database records having data representing:
         a list of multiple instances of the second local computing service corresponding to the user account and to additional user accounts deployed in multiple availability zones including the first and second availability zones; and
         corresponding IP addresses for accessing the multiple instances of the second local computing service;
      selecting, from the queried list of instances of the second local computing service, an instance of the second local computing service of the overall virtual computing service provided by the servers in the second availability zone; and
      performing the data operation contained in the user request using both the selected instance of the first local computing services and the instance of the second local computing service provided by the servers in both the first and second availability zones, respectively, thereby stitching the first and second local computing services from the first and second availability zones together as the overall virtual computing service for providing zone redundant computing services in the distributed computing system.

2. The method of claim 1 wherein:
   the first and second availability zones include additional servers each providing a software load balancer having a corresponding IP address;
   receiving the user request includes:
      receiving the user request for the data operation at a universal resource locator from a client device of the user;
      providing a list of IP addresses corresponding to the software load balancers from both the first and second availability zones to the client device; and
      forwarding the user request to a software load balancer at the server in the first availability zone when the client device randomly selects one of the IP addresses corresponding to the software load balancer at the server in the first availability zone.

3. The method of claim 1 wherein:
   the server at the first availability zone provides a software load balancer; and
   in response to receiving the user request, using the software load balancer,
      selecting a frontend service from multiple frontend services provided by servers at the first availability zone; and
      routing the received user request to the selected frontend service to process the user request.

4. The method of claim 1 wherein:
   the database contains a table having multiple entries, each entry containing a service type and a network address corresponding to a computing service from either the first availability zone or the second availability zone; and
   querying the database includes searching the table for a list of backend services corresponding to the user account of the user.

5. The method of claim 1 wherein selecting the one or more computing services includes:
   determining whether a computing service from the list of computing services is currently available; and
   in response to determining that the computing service from the list of computing services is currently available, selecting the computing service to perform the data operation.

6. The method of claim 1 wherein selecting the one or more computing services includes:
   determining whether a computing service from the list of computing services is currently available; and
   in response to determining that the computing service from the list of computing services is not currently available, repeating the determining operation for another computing service from the list of computing services.

7. The method of claim 1 wherein:
   receiving the user request includes processing the user request at a frontend service provided by the server at the first availability zone;
   querying the database includes querying the database to identify a partition service corresponding to the user account of the user, the partition service being configured to determine a backend storage service suitable to facilitate the requested data operation; and
   upon identifying the partition service located at the second availability zone, transmitting a query request from the frontend service at the first availability zone to the partition service at the second availability zone for determining the backend storage service suitable to facilitate the requested data operation.

8. The method of claim 1 wherein:
the distributed computing system further includes a third availability zone different from the first and second availability zones;
receiving the user request includes processing the user request at a frontend service provided by the server at the first availability zone;
querying the database includes querying the database to identify a partition service corresponding to the user account of the user, the partition service located at the second availability zone;
upon identifying the partition service located at the second availability zone, using the identified partition service to determine a backend storage service suitable to facilitate the requested data operation, the backend storage service being located in the third availability zone; and
performing the data operation includes performing the data operation using the determined backend storage service located at the third availability zone.

9. The method of claim 1 wherein:
the data operation includes a data write operation; and
selecting the one or more computing services includes selecting multiple backend storage services for storing user data in the distributed computing system, at least one selected backend storage service being located in each of the first and second availability zones.

10. A computing device in a distributed computing system having multiple network connected availability zones individually containing multiple servers interconnected to one another by a computer network, the computing device comprising:
a processor; and
a memory operatively coupled to the processor, the memory containing instructions executable by the processor to cause the computing device to:
upon receiving, at the computing device, a user request from a user for a data operation to be performed in the distributed computing system by an overall virtual computing service having multiple computing services,
query a database in a first availability zone to which the computing device belongs for a list of computing services corresponding to a user account of the user and provided by servers in a second availability zone different than the first availability zone, the first and second availability zones having respective independent power, computer network, and cooling infrastructure, wherein the database containing database records having data representing:
a list of the computing services corresponding to the user account and to additional user accounts deployed in multiple availability zones including the first and second availability zones; and
corresponding IP addresses for accessing the list of the computing services;
select, from the queried list of computing services, one or more computing services provided by the servers in the second availability zone; and
transmit an instruction to the servers corresponding to the selected one or more computing services in the second availability zone for performing the requested data operation in conjunction with a computing service provided by servers in the first availability zone, thereby stitching the computing service from the first availability zone and the one or more computing services from the second availability zone together as the overall virtual computing service for providing zone redundant computing services to the user in the distributed computing system.

11. The computing device of claim 10 wherein the memory contains additional instructions executable by the processor to cause the computing device to:
provide a software load balancer having a corresponding IP address; and
upon receiving the user request,
select a frontend service from multiple frontend services provided by servers at the first availability zone; and
route the received user request to the selected frontend service to process the user request.

12. The computing device of claim 10 wherein:
to query the database includes to query the database for the list of computing services at the second availability zone, each of the computing services having a corresponding network address; and
to transmit the instruction includes to transmit the instruction to the servers in the second availability zone according to the network addresses.

13. The computing device of claim 10 wherein the memory contains additional instructions executable by the processor to cause the computing device to:
determine whether a computing service from the list of computing services at the second availability zone is currently available; and
in response to determining that the computing service from the list of computing services is currently available, select the computing service to perform the data operation.

14. The computing device of claim 10 wherein the memory contains additional instructions executable by the processor to cause the computing device to:
determine whether a computing service from the list of computing services at the second availability zone is currently available; and
in response to determining that the computing service from the list of computing services is not currently available, repeat the determining operation for another computing service from the list of computing services.

15. The computing device of claim 10 wherein the memory contains additional instructions executable by the processor to cause the computing device to:
provide a frontend service to receive the user request; and
to query the database includes to query the database for a partition service from the second availability zone and corresponding to the user account of the user; and
to transmit the instruction includes to transmit the instruction to one of the servers in the second availability zone that is providing the identified partition service.

16. A method of implementing zone redundant computing services in a distributed computing system having multiple network connected availability zones individually containing multiple servers interconnected to one another by a computer network, the method comprising:
upon receiving, at one of the servers, a user request from a user for a data operation to be performed in the distributed computing system by an overall virtual computing service having multiple computing services, querying a database in a first availability zone to which the computing device belongs for a list of computing services corresponding to a user account of the user and provided by servers in a second availability zone different than the first availability zone, the first and second availability zones having respective independent power, computer network, and cooling infrastructure, wherein the database containing database records having data representing:
- a list of the computing services corresponding to the user account and to additional user accounts deployed in multiple availability zones including the first and second availability zones; and
- corresponding IP addresses for accessing the list of the computing services;

selecting, from the queried list of computing services, one or more computing services provided by the servers in the second availability zone; and transmitting an instruction to the servers corresponding to the selected one or more computing services in the second availability zone for performing the requested data operation in conjunction with a computing service provided by servers in the first availability zone, thereby stitching the computing service from the first availability zone and the one or more computing services from the second availability zone together as the overall virtual computing service for providing zone redundant computing services to the user in the distributed computing system.

17. The method of claim 16, further comprising:

providing a software load balancer having a corresponding IP address; and upon receiving the user request,
- selecting a frontend service from multiple frontend services provided by servers at the first availability zone; and
- routing the received user request to the selected frontend service to process the user request.

18. The method of claim 16 wherein:

querying the database includes querying the database for the list of computing services at the second availability zone, each of the computing services having a corresponding network address; and transmitting the instruction includes transmitting the instruction to the servers in the second availability zone according to the network addresses.

19. The method of claim 16, further comprising:

determining whether a computing service from the list of computing services at the second availability zone is currently available; and in response to determining that the computing service from the list of computing services is currently available, selecting the computing service to perform the data operation.

20. The method of claim 16, further comprising:

determining whether a computing service from the list of computing services at the second availability zone is currently available; and in response to determining that the computing service from the list of computing services is not currently available, repeating the determining operation for another computing service from the list of computing services.

* * * * *